US012000353B2

(12) United States Patent
Nakano et al.

(10) Patent No.: US 12,000,353 B2
(45) Date of Patent: Jun. 4, 2024

(54) INTAKE SYSTEM

(71) Applicant: Honda Motor Co., Ltd., Tokyo (JP)

(72) Inventors: Jun Nakano, Tokyo (JP); Noriyuki Suzuki, Tokyo (JP); Akihiko Matsukawa, Tokyo (JP); Yoshikazu Goto, Tokyo (JP); Kenichi Sano, Tokyo (JP); Akihiro Kanoe, Tokyo (JP); Takeo Kato, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/124,903

(22) Filed: Mar. 22, 2023

(65) Prior Publication Data

US 2023/0313745 A1 Oct. 5, 2023

(30) Foreign Application Priority Data

Mar. 31, 2022 (JP) ................................ 2022-058056

(51) Int. Cl.
*F02D 9/10* (2006.01)

(52) U.S. Cl.
CPC ........... *F02D 9/1065* (2013.01); *F02D 9/109* (2013.01)

(58) Field of Classification Search
CPC ........... F02D 9/10; F02D 9/1065; F02D 9/109
See application file for complete search history.

(56) References Cited

U.S. PATENT DOCUMENTS

| | | | | |
|---|---|---|---|---|
| 5,190,007 A | 3/1993 | Joyce | | |
| 8,091,527 B1 * | 1/2012 | Brown | F02D 13/0207 | 123/295 |
| 8,555,855 B2 * | 10/2013 | Tsutsumi | F02M 69/044 | 123/336 |
| 2015/0083078 A1 * | 3/2015 | Kontani | F02D 9/1065 | 123/337 |

(Continued)

FOREIGN PATENT DOCUMENTS

| | | |
|---|---|---|
| JP | 62-87135 U | 6/1987 |
| JP | 4-314936 A | 11/1992 |

(Continued)

OTHER PUBLICATIONS

Japanese Office Action for Japanese Application No. 2022-058056, dated Jul. 11, 2023, with an English translation.

*Primary Examiner* — John Kwon
*Assistant Examiner* — Johnny H Hoang
(74) *Attorney, Agent, or Firm* — Birch, Stewart, Kolasch & Birch, LLP

(57) ABSTRACT

An intake system of an internal combustion engine, in which a phase angle between throttle valves is provided in order to perform combustion appropriate for each cylinder so as to stabilize a number of revolutions and thereby suppress generation of unburned gas, is provided. The intake system is provided to intake passages of an internal combustion engine with parallel cylinders. The intake system includes a power transmission mechanism configured to transmit power from a power source to throttle shafts so as to synchronize and simultaneously turn a plurality of throttle valves and thereby open and close the intake passages. At least one of the throttle valves is an angled throttle valve having a phase angle at an open position relative to the other throttle valve.

5 Claims, 8 Drawing Sheets

(56) References Cited

U.S. PATENT DOCUMENTS

2016/0160763 A1* 6/2016 Matsuda ................ B62K 11/04
123/403

FOREIGN PATENT DOCUMENTS

| | | | |
|---|---|---|---|
| JP | 2007-198217 | A | 8/2007 |
| JP | 2009-41478 | A | 2/2009 |
| JP | 2013-194659 | A | 9/2013 |

* cited by examiner

INTAKE SYSTEM

BACKGROUND

1. Technical Field

The present invention relates to an intake system of an internal combustion engine with parallel cylinders.

2. Description of the Background

Some intake systems of internal combustion engines with parallel cylinders have a throttle body that is provided to an intake passage extended from a combustion chamber of each cylinder. In this intake system, throttle valves, which open and close the intake passages of respective throttle bodies to adjust intake flow rates, are operated and synchronized with each other so as to rotate simultaneously (for example, refer to Patent Literature 1).

CITATION LIST

Patent Literature

Patent Literature 1: Japanese Unexamined Patent Application Publication No. 2009-41478

In the intake system of the internal combustion engine disclosed in Patent Literature 1, the throttle bodies, which are provided to the intake passages extended from respective combustion chambers of the parallel cylinders, are disposed in parallel, and a shared throttle shaft penetrates both of the throttle bodies and is rotatably laid via bearings.

Each throttle valve that opens and closes the intake passage of each throttle body is integrally attached to the shared throttle shaft.

The structure is configured such that, in response to the throttle shaft being rotated via a gear train by driving a motor, the two throttle valves, which are integrally attached to the throttle shaft, rotate simultaneously by the same angle to open the intake passages by the same degree of opening.

BRIEF SUMMARY

Normally, for a low number of revolutions, in consideration of a low flow rate in an intake pipe and in an exhaust pipe, the intake pipe and the exhaust pipe are elongated and thinned in order to use inertial forces of flowing intake air and exhaust air, thereby increasing charging and discharging efficiencies and improving output. Unfortunately, the intake pipe and the exhaust pipe, which are elongated and thinned, increase intake and exhaust resistances and cause a reduction in output at a high number of revolutions.

Conversely, for a high number of revolutions, the intake pipe and the exhaust pipe are shortened and widened due to high flow rates.

Although being parallel to each other, the cylinders have different intake pipes and exhaust pipes. In this state, closing all throttle valves at the time of full close, as in the case of Patent Literature 1, makes the cylinders have mutually different combustion efficiencies. In particular, during a low number of revolutions, such as idling, a low-output cylinder (e.g., a cylinder having wide and short intake pipe and exhaust pipe that cause a decrease in output) is reduced in combustion efficiency and has an unstable number of revolutions, which may generate unburned gas.

The present invention has been achieved in view of these circumstances, and an object of the present invention is to provide an intake system of an internal combustion engine, in which a phase angle between throttle valves is provided in order to perform combustion appropriate for each cylinder so as to stabilize a number of revolutions and thereby suppress generation of unburned gas.

In order to achieve the above object, the present invention provides an intake system provided to intake passages of an internal combustion engine with parallel cylinders. The intake system includes throttle bodies being provided to the intake passages that are extended from combustion chambers of the cylinders. The throttle bodies are configured to adjust flow rates of intake air. The intake system also includes throttle valves being rotatably and axially supported by the throttle bodies while being fixed to throttle shafts. The throttle valves are configured to open and close the intake passages of the throttle bodies so as to control flow rates of intake air flowing into the cylinders. The intake system also includes a power transmission mechanism configured to transmit power from a power source to the throttle shafts so as to synchronize and simultaneously turn the plurality of throttle valves and thereby open and close the intake passages. At least one of the throttle valves is an angled throttle valve having a phase angle at an open position relative to the other throttle valve.

In this structure, the intake system includes the power transmission mechanism configured to transmit power from the power source to the throttle shafts so as to synchronize and simultaneously turn the plurality of throttle valves and thereby open and close the intake passages. At least one of the throttle valves is an angled throttle valve having a phase angle at an open position relative to the other throttle valve. Disposing the angled throttle valve having the phase angle in the intake passage that communicates with a cylinder having a low combustion efficiency, varies an intake flow rate and combustion efficiency, resulting in improving combustion efficiency. This makes it possible to stabilize the number of revolutions and reduce unburned gas.

In one preferred embodiment of the present invention, the angled throttle valve may be disposed in the intake passage that communicates with the cylinder in which output is low at the time of idling.

In this structure, the angled throttle valve is disposed in the intake passage that communicates with the cylinder in which output is low at the time of idling. Thus, the angled throttle valve having the phase angle improves combustion efficiency of the cylinder in which output is low at the time of idling, whereby it is possible to effectively stabilize the number of revolutions and reduce unburned gas.

In one preferred embodiment of the present invention, the phase angle of the angled throttle valve relative to the other throttle valve may be a minute angle.

In this structure, the phase angle of the angled throttle valve relative to the other throttle valve is a minute angle, which prevents a difference in combustion efficiency between the cylinders, particularly during idling, resulting in stabilizing the number of revolutions.

In one preferred embodiment of the present invention, the other throttle valve may be supported by a first throttle shaft, whereas the angled throttle valve may be supported by a second throttle shaft, and the first throttle shaft and the second throttle shaft may be separate bodies and be disposed coaxially. In this case, the first throttle shaft may be fitted with a first alignment lever, the second throttle shaft may be fitted with a second alignment lever, and a phase angle adjustment mechanism for adjusting the phase angle may be provided between the first alignment lever and the second alignment lever.

In this structure, the first throttle shaft is fitted with the first alignment lever, the second throttle shaft is fitted with the second alignment lever, and the phase angle adjustment mechanism for adjusting the phase angle is provided between the first alignment lever and the second alignment lever. Under these conditions, it is possible to adjust the phase angle in accordance with type and driving environment of a vehicle and thereby appropriately set depending on situations.

In one preferred embodiment of the present invention, the first alignment lever may include a first full closing degree adjuster for adjusting a full closing degree of the other throttle valve during non-operation of the power source, whereas the second alignment lever may include a second full closing degree adjuster for adjusting a full closing degree of the angled throttle valve during non-operation of the power source.

In this structure, the first alignment lever includes the first full closing degree adjuster for adjusting the full closing degree of the other throttle valve during non-operation of the power source, whereas the second alignment lever includes the second full closing degree adjuster for adjusting the full closing degree of the angled throttle valve during non-operation of the power source. In other words, the first full closing degree adjuster is provided to the first alignment lever that is fitted to the first throttle shaft, whereas the second full closing degree adjuster is provided to the second alignment lever that is fitted to the second throttle shaft, which is a separate body. Thus, misalignment due to tolerance of each part can be absorbed by the individual full closing degree adjusters.

In the present invention, the intake system includes the power transmission mechanism configured to transmit power from the power source to the throttle shafts so as to synchronize and simultaneously turn the plurality of throttle valves and thereby open and close the intake passages. At least one of the throttle valves is an angled throttle valve having a phase angle at an open position relative to the other throttle valve. Disposing the angled throttle valve having the phase angle in a cylinder having a low combustion efficiency, varies an intake flow rate and combustion efficiency, resulting in improving combustion efficiency. This makes it possible to stabilize the number of revolutions and reduce unburned gas.

DETAILED DESCRIPTION

Hereinafter, an embodiment according to the present invention will be described on the basis of FIGS. 1 to 8.

Figure 1:
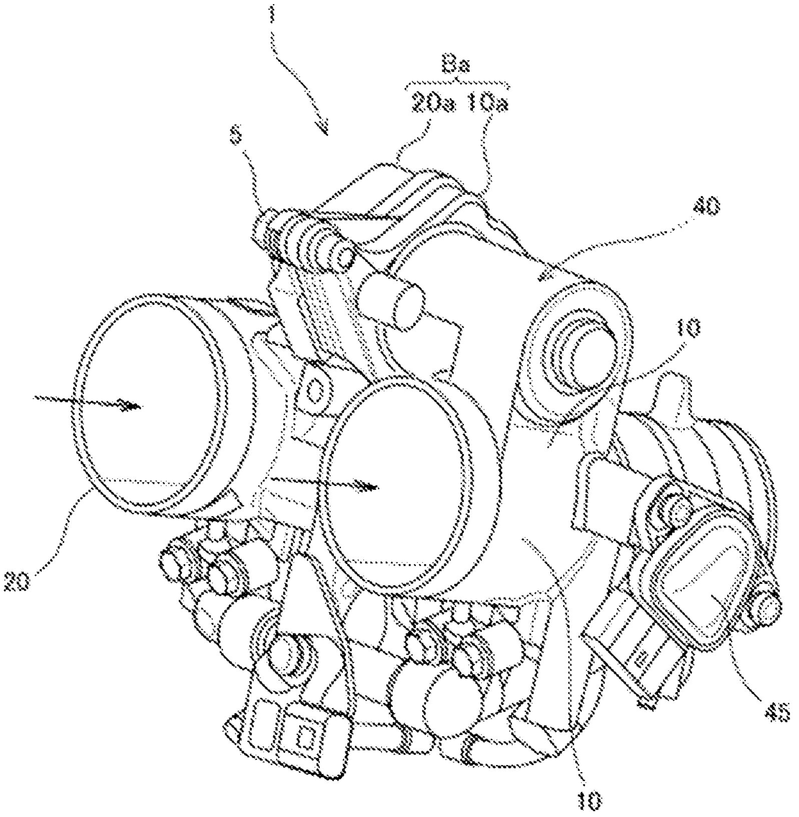
FIG. 1 is a perspective view of an intake system according to an embodiment of the present invention.
Figure 2:
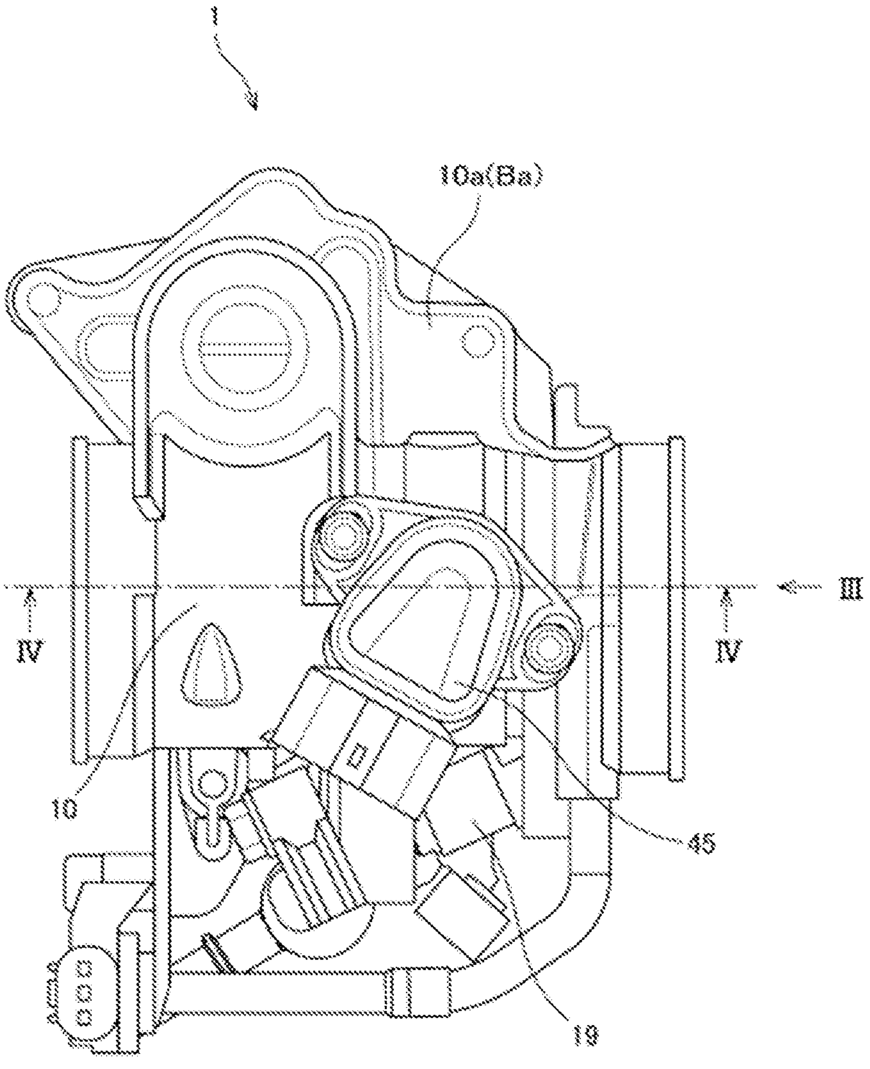
FIG. 2 is a side view of the intake system.

FIG. 1 is a perspective view of an intake system 1 according to an embodiment using the present invention.

The intake system 1 is an intake system of an internal combustion engine with parallel cylinders and includes a cylindrical first throttle body 10 and a cylindrical second throttle body 20 that are coupled and integrated together in the state of being arranged in parallel. The first throttle body 10 and the second throttle body 20 are respectively provided to intake passages extended from combustion chambers of corresponding cylinders and adjust intake flow rates.

Figure 3:
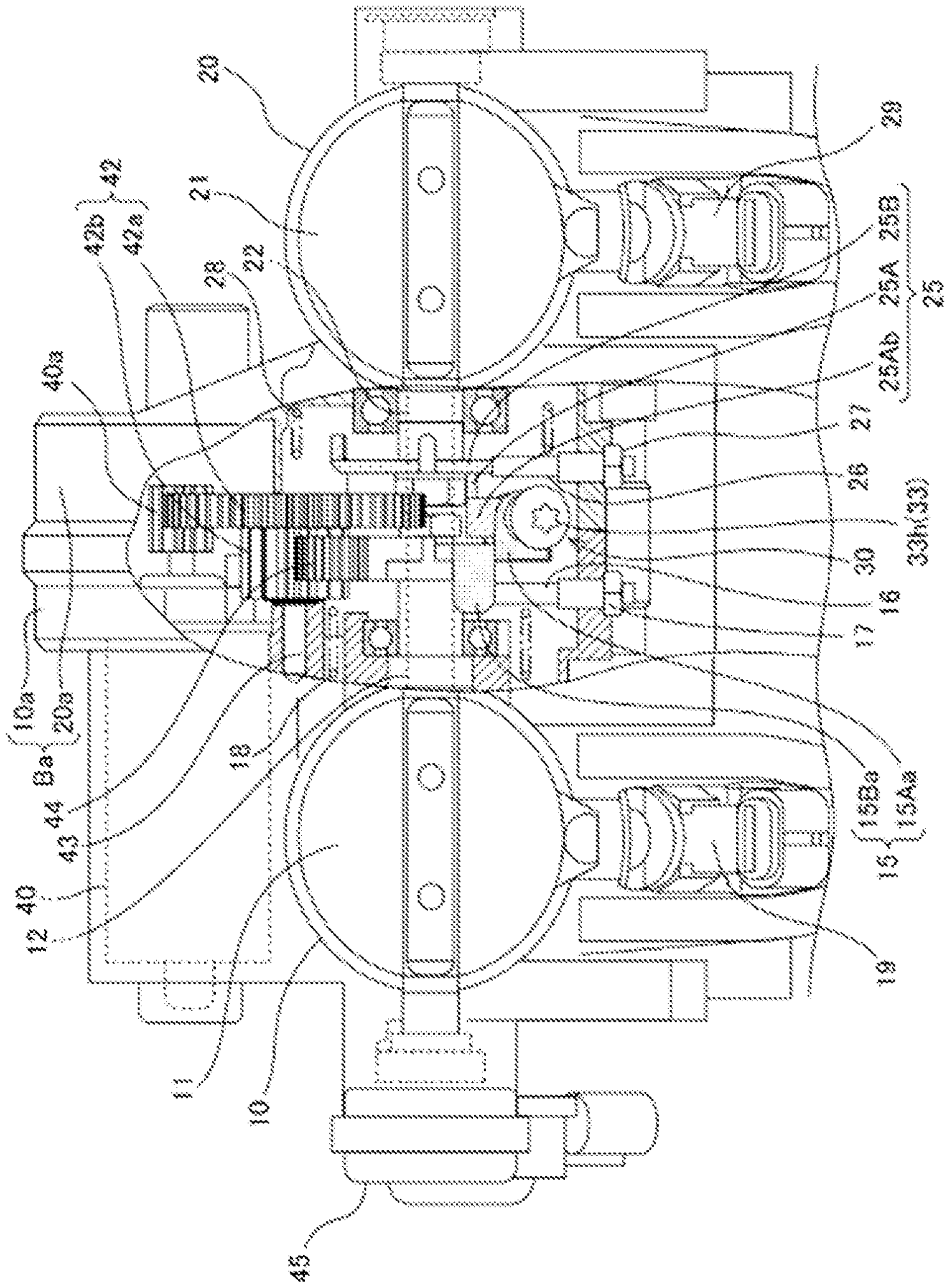
FIG. 3 is a partially cut view of the intake system as seen from an arrow III in FIG. 2.
Figure 4:
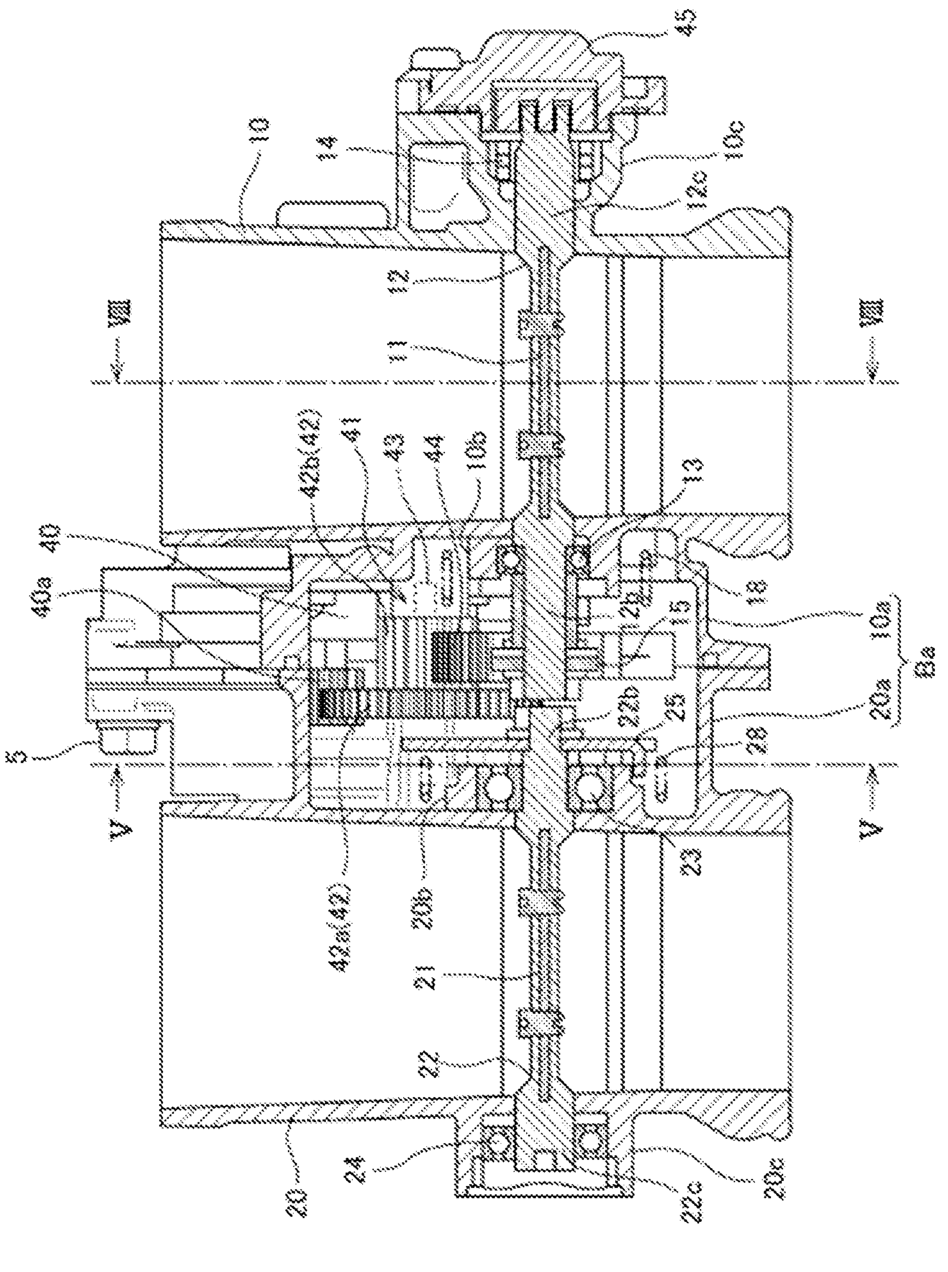
FIG. 4 is a sectional view of the intake system as seen from an arrow IV-IV in FIG. 2.

With reference to FIGS. 3 and 4, a coupling housing part 10*a* extending toward the second throttle body 20 of the first throttle body 10 and a coupling housing part 20*a* extending toward the first throttle body 10 of the second throttle body 20 are joined and united by tightening bolts 5. Thus, the first throttle body 10 and the second throttle body 20 are coupled and integrated together via the coupling housing parts 10*a* and 20*a*.

The coupling housing parts 10*a* and 20*a* in the united state form a gearbox Ba for housing a reduction gear mechanism 41, which is a power transmission mechanism.

As shown in FIG. 1, the first throttle body 10 and the second throttle body 20 are mounted to an internal combustion engine, so that directions of flows of intake air in the intake passages (directions shown by arrows in FIG. 1) will be parallel to each other and be tilted slightly downward from a horizontal direction.

The first throttle body 10 rotatably and axially supports a first throttle valve 11 that is fixed to a first throttle shaft 12. The first throttle valve 11 opens and closes the intake passage of the first throttle body 10.

Similarly, the second throttle body 20 rotatably and axially supports a second throttle valve 21 that is fixed to a second throttle shaft 22. The second throttle valve 21 opens and closes the intake passage of the second throttle body 20.

The first throttle shaft 12 and the second throttle shaft 22 are coaxial with each other.

With reference to FIG. 4, the first throttle shaft 12, which fixes and supports the first throttle valve 11, has an inside end part 12*b* on the second throttle body 20 side, and the inside end part 12*b* is axially supported via a bearing 13 by an expanded inside bearing part 10*b* of the first throttle body 10 and protrudes into the gearbox Ba.

The inside end part 12*b* of the first throttle shaft 12 is wound with a return spring 18 for biasing the first throttle valve 11 to a close position.

The first throttle shaft 12 has an outside end part 12*c* on a side opposite to the second throttle body 20, and the outside end part 12*c* is axially supported via a bearing 14 by an expanded outside bearing part 10*c* of the first throttle body 10.

The outside end part 12*c* of the first throttle shaft 12 is attached with a throttle position sensor 45 for measuring the degree of opening of the first throttle valve 11.

On the other hand, the second throttle shaft 22, which fixes and supports the second throttle valve 21, has an inside end part 22*b* on the first throttle body 10 side, and the inside end part 22*b* is axially supported via a bearing 23 by an expanded inside bearing part 20*b* of the second throttle body 20 and protrudes into the gearbox Ba.

The inside end part 22*b* of the second throttle shaft 22 is wound with a return spring 28 for biasing the second throttle valve 21 to a close position.

The second throttle shaft 22 has an outside end part 22*c* on a side opposite to the first throttle body 10, and the outside end part 22*c* is axially supported via a bearing 24 by an expanded outside bearing part 20*c* of the second throttle body 20.

The first throttle shaft 12 and the second throttle shaft 22, which are coaxially with each other, are close to each other at the inside end part 12*b* of the first throttle shaft 12 and the inside end part 22*b* of the second throttle shaft 22, which protrude into the gearbox Ba.

With reference to FIG. 3, the first throttle body 10 is attached with a first injector 19 at a lower side, and the first injector 19 injects fuel to a downstream side of the first throttle valve 11 in the intake passage of the first throttle body 10.

Similarly, the second throttle body 20 is attached with a second injector 29 at a lower side, and the second injector 29 injects fuel to a downstream side of the second throttle valve 21 in the intake passage of the second throttle body 20.

The first throttle body 10 has a motor 40 that is mounted at an upper side while a pinion gear 40*a* being an output shaft is protruded toward the second throttle body 20, in parallel to the first throttle shaft 12 and the second throttle shaft 22.

The pinion gear 40*a* of the motor 40 protrudes into the gearbox Ba.

The inside end part 12*b* protruding into the gearbox Ba of the first throttle shaft 12 is fitted with a first alignment lever 15 (illustrated with a dense dot pattern in the drawings) that turns together with the first throttle shaft 12.

Moreover, the inside end part 22*b* protruding into the gearbox Ba of the second throttle shaft 22 is fitted with a second alignment lever 25 (illustrated with a thin dot pattern in the drawings) that turns together with the second throttle shaft 22.

A phase angle adjustment mechanism 30 is provided between the first alignment lever 15 and the second alignment lever 25, and it adjusts a phase angle of the second throttle valve 21 relative to the first throttle valve 11.

Figure 6:
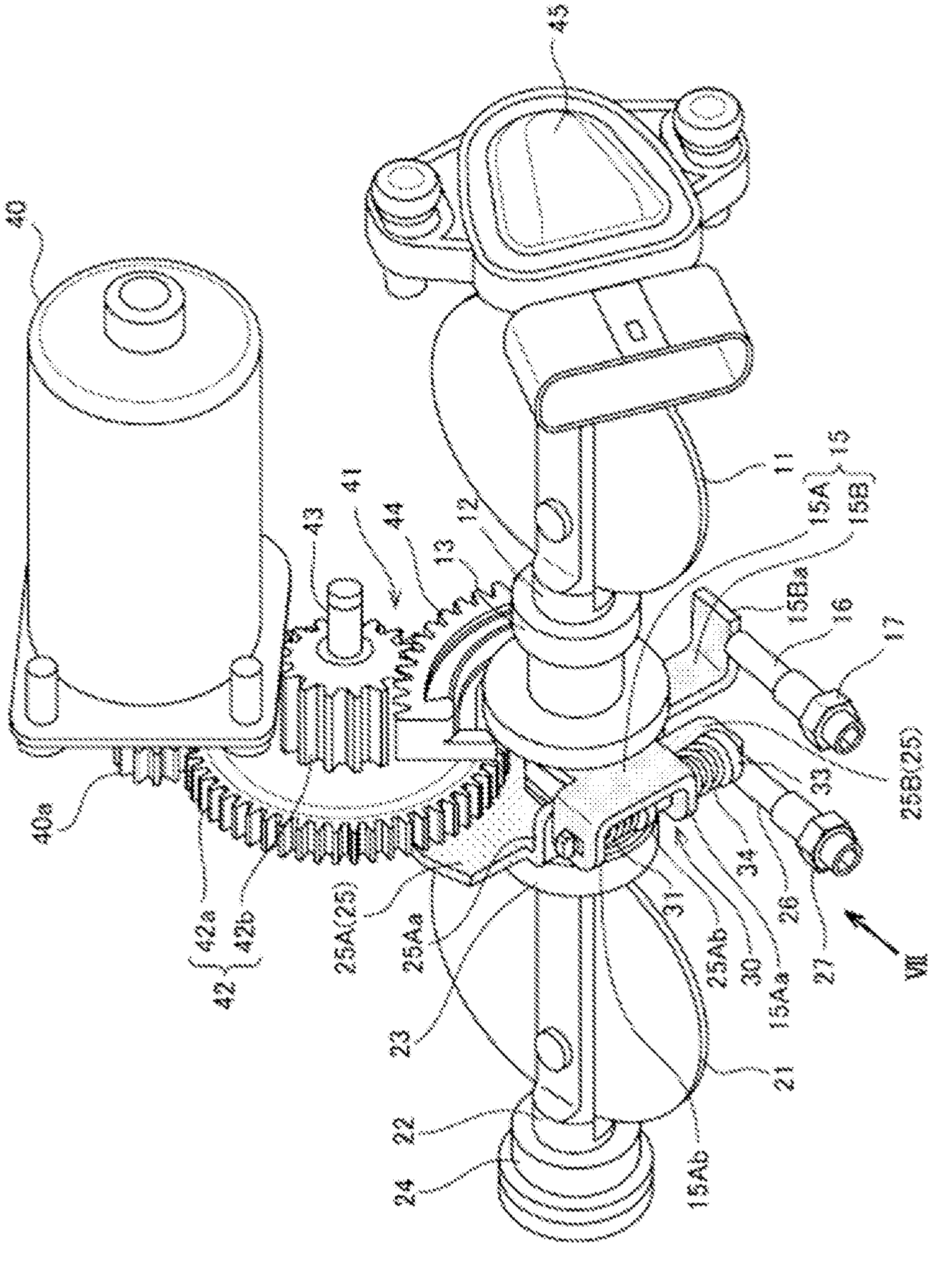
FIG. 6 is a perspective view showing a drive mechanism of throttle valves of the intake system.

With reference to FIG. 6, the first alignment lever 15 has a pair of facing bent pieces 15Aa and 15Ab that are formed by bending an alignment bar 15A into a fork shape, and the alignment bar 15A extends radially from a base that is fitted to the first throttle shaft 12.

In addition, a limiting bar 15B extends in a radial direction approximately perpendicular to the alignment bar 15A, from the base of the first alignment lever 15, and a bent piece 15Ba is formed by bending an end of the limiting bar 15B.

Figure 5:
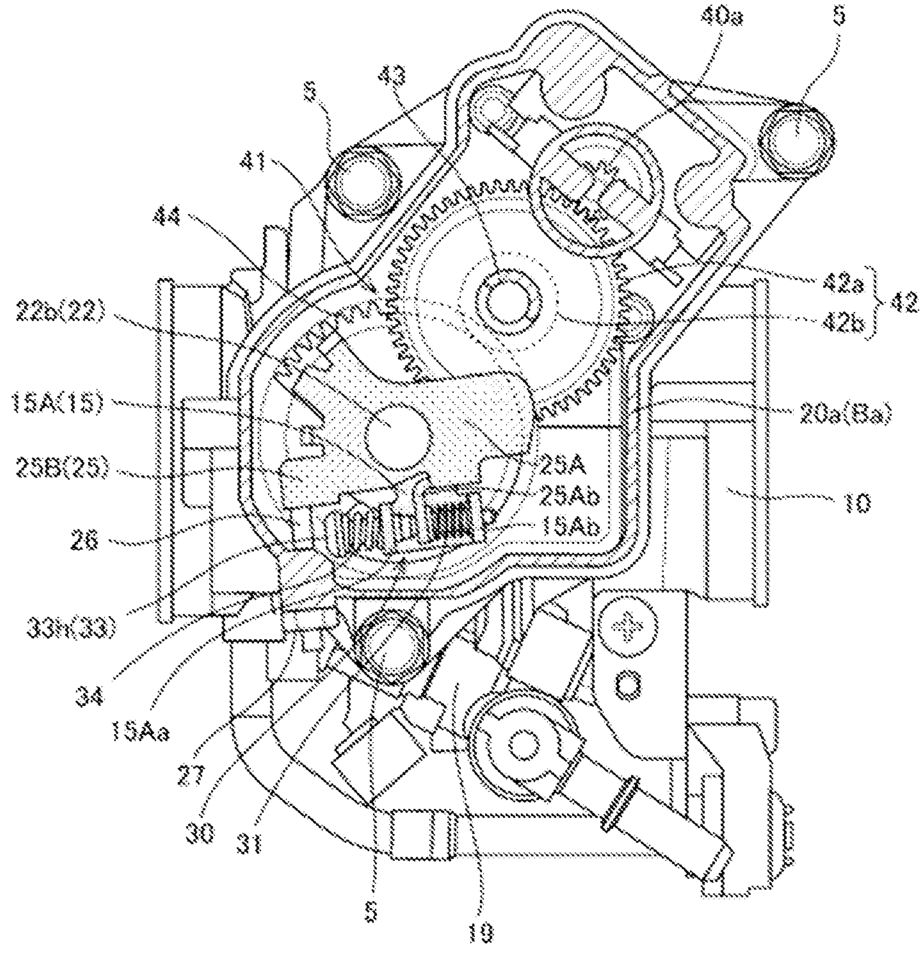
FIG. 5 is a sectional view of the intake system as seen from an arrow V-V in FIG. 4.
Figure 7:
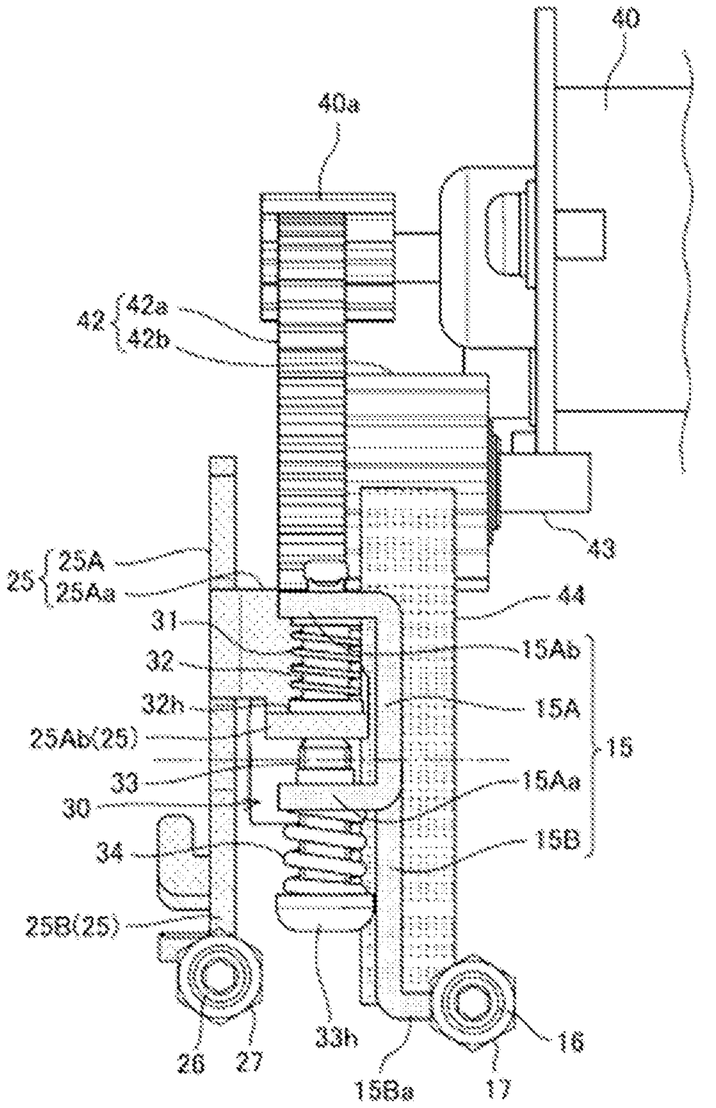
FIG. 7 is a view showing a phase angle adjustment mechanism as seen from an arrow VII in FIG. 6.

On the other hand, with reference to FIGS. 5 to 7, the second alignment lever 25 has an alignment bar 25A that extends radially from a base fitted to the second throttle shaft 22, and a part of a side edge of the alignment bar 25A is bent toward the first alignment lever 15 to form a bent part 25Aa, which is further bent at a side to form a bent piece 25Ab.

In addition, a limiting bar 25B extends in a radial direction from the base of the second alignment lever 25 to a side opposite to the alignment bar 25A.

With reference to FIGS. 5 to 7, the bent piece 25Ab of the alignment bar 25A of the second alignment lever 25 is positioned between the facing bent pieces 15Aa and 15Ab of the alignment bar 15A of the first alignment lever 15.

A transmission spring 31 is interposed between the bent piece 25Ab of the second alignment lever 25 and the bent piece 15Ab, which is one of the pair of the facing bent pieces 15Aa and 15Ab of the first alignment lever 15.

The transmission spring 31 is a coil spring, and a support pin 32 penetrates inside thereof to maintain straight extension and contraction of the transmission spring 31.

The support pin 32 slidably penetrates through the bent piece 15Ab of the first alignment lever 15 and has an enlarged-diameter head 32*h* at an end. The head 32*h* is in contact with the bent piece 25Ab of the second alignment lever 25. Thus, the transmission spring 31 is interposed between the head 32*h* and the bent piece 15Ab, in a compressed state.

A phase angle adjustment screw 33 is screwed into the other bent piece 15Aa of the first alignment lever 15 from a side opposite to the bent piece 25Ab of the second alignment lever 25 and is in contact with the bent piece 25Ab at the tip.

A compression spring 34 is interposed between a head 33*h* of the phase angle adjustment screw 33 and the bent piece 15Aa, and the screwed position of the phase angle adjustment screw 33 is maintained by a biasing force of the compression spring 34.

With reference to FIG. 5, as the phase angle adjustment screw 33 is advanced by turning it to the right, the tip of the phase angle adjustment screw 33 moves in a direction away from the bent piece 15Aa while pressing the bent piece 25Ab of the second alignment lever 25. In response to this, the second alignment lever 25 turns counterclockwise in a side view in FIG. 5, relative to the first alignment lever 15, while making the second throttle shaft 22 rotate together, whereby the second throttle valve 21, which is integrated with the second throttle shaft 22, is rotated in a direction to close relative to the first throttle valve 11.

Conversely, as the phase angle adjustment screw 33 is reversed by turning it to the left, the bent piece 25Ab of the second alignment lever 25 in contact with the tip of the phase angle adjustment screw 33 is moved in a direction approaching the bent piece 15Aa by the biasing force of the transmission spring 31. In response to this, the second alignment lever 25 turns clockwise in a side view in FIG. 5, relative to the first alignment lever 15, and it rotates the second throttle valve 21 in a direction to open relative to the first throttle valve 11, via the second throttle shaft 22.

That is, the second throttle valve 21 corresponds to an angled throttle valve.

As described above, the phase angle adjustment mechanism 30 enables adjusting a phase angle of the second throttle valve (angled throttle valve) 21 relative to the first throttle valve 11 by turning the phase angle adjustment screw 33.

In addition, in the phase angle adjustment mechanism 30, turning of the first alignment lever 15 is transmitted to turning of the second alignment lever 25 via the transmission spring 31.

The inside end part 12*b* protruding into the gearbox Ba of the first throttle shaft 12 is fitted with the first alignment lever 15 and is also fitted with a sector gear 44 that is integrated with the first alignment lever 15.

A double gear 42 is interposed between the pinion gear 40*a* of the motor 40 and the sector gear 44, whereby the reduction gear mechanism 41 is constructed in the gearbox Ba.

The double gear 42 has an integrated body of a large-diameter gear 42*a* and a small-diameter gear 42*b* that are axially supported in a rotatable manner by a support shaft 43, which is supported by the coupling housing part 10*a* of the gearbox Ba. The large-diameter gear 42*a* meshes with the pinion gear 40*a* of the motor 40, whereas the small-diameter gear 42*b* meshes with the sector gear 44 having a larger diameter than the small-diameter gear 42*b*, whereby the reduction gear mechanism 41 is constructed.

Thus, rotation of the pinion gear 40_a_ driven by the motor 40 is transmitted to the sector gear 44 via the double gear 42, and the sector gear 44 is rotated in a decelerated manner.

Rotation of the sector gear 44 makes the first throttle shaft 12 rotate together with the first throttle valve 11 and also makes the first alignment lever 15 turn together.

Turning of the first alignment lever 15 is transmitted to turning of the second alignment lever 25 via the transmission spring 31 of the phase angle adjustment mechanism 30, and turning of the second alignment lever 25 causes the second throttle shaft 12 to rotate together with the second throttle valve 21.

In short, the first throttle valve 11 is rotated via the reduction gear mechanism 41 by driving the motor 40, and at the same time, the second throttle valve 21 is rotated synchronously with rotation of the first throttle valve 11 via the phase angle adjustment mechanism 30.

In the internal combustion engine provided with the intake system 1 according to this embodiment, output of one of the parallel cylinders is lower than that of the other parallel cylinder at the time of idling.

The second throttle body 20 is provided so that the second throttle valve 21 will be disposed in the intake passage that communicates with the cylinder in which output is low at the time of idling.

The first throttle body 10 is provided so that the first throttle valve 11 will be disposed in the intake passage that communicates with the other cylinder.

The second throttle valve (angled throttle valve) 21 is set so as to have a phase angle θ at an open position relative to the first throttle valve 11.

The phase angle θ of the second throttle valve 21 relative to the first throttle valve 11 is a minute angle.

The minute angle described herein means an angle of greater than zero degree but not more than three degrees.

If the phase angle exceeds three degrees, idling can be unstable.

Figure 8:
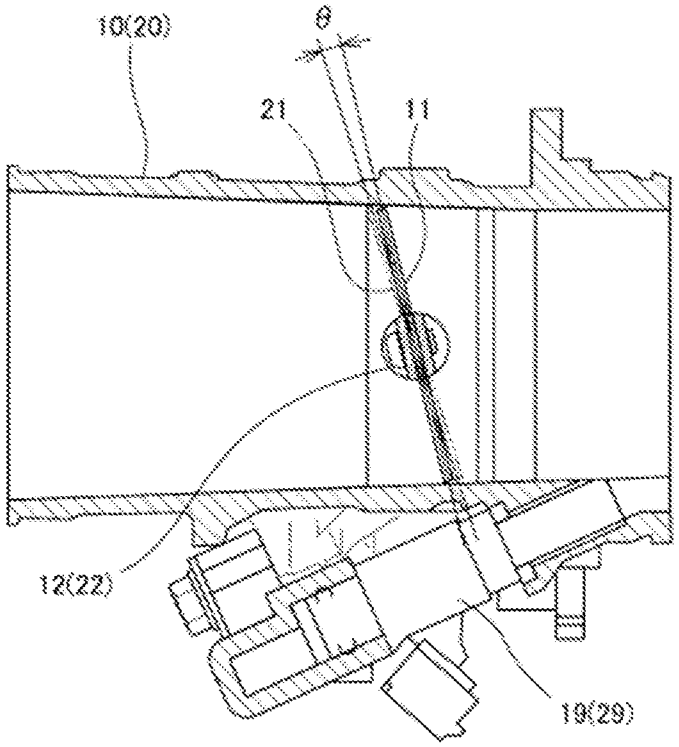
FIG. 8 is a sectional view of the intake system as seen from an arrow VIII-VIII in FIG. 4.

FIG. 8 shows states of the first throttle valve 11 and the second throttle valve (angled throttle valve) 21 during non-operation (or stop) of the motor 40, which are indicated by solid lines and two-dot chain lines, respectively.

The first throttle valve 11 completely closes the intake passage of the first throttle body 10, that is, a full closing degree is zero degrees.

On the other hand, the second throttle valve (angled throttle valve) 21 opens by the phase angle θ at an open position relative to the first throttle valve 11, that is, the full closing degree is θ degrees.

The first alignment lever 15 includes a first full closing degree adjustment bolt 16 for adjusting the full closing degree of the first throttle valve 11 during stop of the motor 40.

On the other hand, the second alignment lever 25 includes a second full closing degree adjustment bolt 26 for adjusting the full closing degree of the second throttle valve 21 during stop of the motor 40.

With reference to FIGS. 3 and 6, the first full closing degree adjustment bolt 16 is screwed into the coupling housing part 10_a_ from the outside and is in contact with the bent piece 15Ba of the limiting bar 15B of the first alignment lever 15, at the tip. The first full closing degree adjustment bolt 16 limits turning in a closing direction of the first throttle valve 11 to set the full closing degree of the first throttle valve 11.

On the other hand, the second full closing degree adjustment bolt 26 is screwed into the coupling housing part 20_a_ from the outside and is in contact with an end of the limiting bar 25B of the second alignment lever 25, at the tip. The second full closing degree adjustment bolt 26 limits turning in the closing direction of the second throttle valve 21 to set the full closing degree of the second throttle valve 21.

The first full closing degree adjustment bolt 16 is screwed until the tip comes into contact with the bent piece 15Ba of the limiting bar 15B of the first alignment lever 15 in the state in which the first throttle valve 11 completely closes the intake passage of the first throttle body 10 in accordance with the biasing force of the return spring 18 during stop of the motor 40. This sets the full closing degree of the first throttle valve 11 to zero degrees.

A nut 17 is screwed from the head of the first full closing degree adjustment bolt 16 to fix the first full closing degree adjustment bolt 16 at the screwed position that is adjusted to make the full closing degree be zero degrees.

On the other hand, the tip of the second full closing degree adjustment bolt 26 is brought into contact with the limiting bar 25B of the second alignment lever 25 in the state in which the second throttle valve 21 completely closes the intake passage of the second throttle body 20 in accordance with the biasing force of the return spring 28 during stop of the motor 40. The second full closing degree adjustment bolt 26 is then further screwed to turn the second alignment lever 25 in a direction to open the second throttle valve 21, against the biasing force of the return spring 28, until the second throttle valve 21 opens by the phase angle θ. This sets the full closing degree of the second throttle valve 21 to θ degrees.

A nut 27 is screwed from the head of the second full closing degree adjustment bolt 26 to fix the second full closing degree adjustment bolt 26 at the screwed position that is adjusted to make the full closing degree be θ degrees.

The full closing degree is adjusted with the use of each of the first full closing degree adjustment bolt 16 and the second full closing degree adjustment bolt 26, in the state in which the coupling between the first alignment lever 15 and the second alignment lever 25 via the phase angle adjustment mechanism 30 is released so as to make the first alignment lever 15 and the second alignment lever 25 be independent from each other.

In this manner, the full closing degrees are adjusted by the first full closing degree adjustment bolt 16 and the second full closing degree adjustment bolt 26, and the screwed positions of the first full closing degree adjustment bolt 16 and the second full closing degree adjustment bolt 26 are set and fixed. Thereafter, the phase angle adjustment mechanism 30 is set up, and the phase angle of the second throttle valve (angled throttle valve) 21 is adjusted relative to the first throttle valve 11.

First, in coupling the first alignment lever 15 and the second alignment lever 25 of the phase angle adjustment mechanism 30 to each other, the phase angle of the second throttle valve 21 relative to the first throttle valve 11 is set to be greater than a desired phase angle θ.

Specifically, the phase angle adjustment screw 33 is screwed at a shallow position.

Then, the bent piece 15Ba of the first alignment lever 15 is brought into contact with the already set first full closing degree adjustment bolt 16 so that the first throttle valve 11 will completely close the intake passage of the first throttle body 10 at the full closing degree of zero degrees.

On the other hand, the second throttle valve 21 opens at an angle greater than the phase angle θ, relative to the first throttle valve 11, and the end of the limiting bar 25B of the second alignment lever 25 is separated from the tip of the second full closing degree adjustment bolt 26.

Under these conditions, as the phase angle adjustment screw 33 is advanced by turning it to the right, it presses the bent piece 25Ab of the second alignment lever 25 to turn the second alignment lever 25 counterclockwise in a side view in FIG. 5, thereby rotating the second throttle valve 21 in the closing direction.

As the phase angle adjustment screw 33 is further advanced, the end of the limiting bar 25B of the second alignment lever 25 approaches and comes into contact with the second full closing degree adjustment bolt 26. In this state, turning the phase angle adjustment screw 33 to the right is stopped, and the phase angle adjustment is finished.

Performing the phase angle adjustment in this manner sets the second throttle valve (angled throttle valve) 21 so as to have the phase angle θ at an open position relative to the first throttle valve 11.

FIG. 8 shows states of the first throttle valve 11 and the second throttle valve 21 during stop of the motor 40, which are indicated by solid lines and two-dot chain lines, respectively.

The first throttle valve 11 completely closes the intake passage of the first throttle body 10 at the full closing degree of zero degrees, whereas the second throttle valve (angled throttle valve) 21 has the full closing degree of θ degrees and opens the intake passage of the second throttle body 20 by the phase angle θ.

It is noted that the phase angle θ is exaggerated to some extent in FIG. 8 for ease of understanding.

The embodiment of the intake system according to the present invention detailed above has effects as described below.

The second throttle valve 21 is provided in the intake passage that communicates with the cylinder in which output is low at the time of idling. In this structure, the second throttle valve (angled throttle valve) 21 opens the intake passage by the phase angle θ relative to the first throttle valve 11 during idling, whereby combustion efficiency of the cylinder in which output is low at the time of idling is improved. Thus, it is possible to effectively stabilize the number of revolutions and reduce unburned gas.

The phase angle θ of the second throttle valve (angled throttle valve) 21 relative to the first throttle valve 11 is a minute angle, which prevents a difference in combustion efficiency between the cylinders, particularly during idling, resulting in stabilizing the number of revolutions.

The first throttle shaft 12 is fitted with the first alignment lever 15, whereas the second throttle shaft 22 is fitted with the second alignment lever 25. The phase angle adjustment mechanism 30 for adjusting the phase angle is provided between the first alignment lever 15 and the second alignment lever 25. Under these conditions, it is possible to adjust the phase angle in accordance with type and driving environment of a vehicle and thereby appropriately set depending on situations.

The first alignment lever 15 includes the first full closing degree adjustment bolt 16 for adjusting the full closing degree of the first throttle valve 11 during stop of the motor 40. The second alignment lever 25 includes the second full closing degree adjustment bolt 26 for adjusting the full closing degree of the second throttle valve 21 during stop of the motor 40. In other words, the first full closing degree adjustment bolt 16 is provided to the first alignment lever 15 that is fitted to the first throttle shaft 12, whereas the second full closing degree adjustment bolt 26 is provided to the second alignment lever 25 that is fitted to the second throttle shaft 22, which is a separate body. Thus, misalignment due to tolerance of each part can be absorbed by the individual full closing degree adjusters.

In this embodiment, the first throttle shaft 12 is wound with the return spring 18 for biasing the first throttle valve 11 to a close position, whereas the second throttle shaft 22 is also wound with the return spring 28 for biasing the second throttle valve 21 to a close position. With this structure, even if the motor 40 is in malfunction, the first throttle valve 11 and the second throttle valve 21 are rotated to close positions by the biasing forces of the return springs 18 and 28 so as to be in the fully closed state, which prevents the number of revolutions from increasing uncontrollably.

Although the intake system according to the embodiment of the present invention is described above, embodiments of the present invention are not limited to the foregoing embodiment and also include those implemented in various forms within the gist of the present invention.

For example, although the first throttle valve 11 and the second throttle valve 21 are respectively supported by the first throttle shaft 12 and the second throttle shaft 22 that are separate bodies in the foregoing embodiment, they may be supported by the same throttle shaft while the second throttle valve 21 may be set so as to have the phase angle θ at an open position relative to the first throttle valve 11.

In addition, in the case of providing throttle shafts separately from each other, a motor may be provided to each throttle shaft as a power source.

In this case, the phase angles of the throttle valves may be set to the same angle, and rotation angles of the throttle valves may be made different from each other by the motors.

Moreover, the present invention can be used also in the case of manually operating the throttle valves, instead of using motors as power sources.

REFERENCE SIGNS LIST

1 . . . intake system, 5 . . . bolt, 10 . . . first throttle body, 10*a* . . . coupling housing part, 11 . . . first throttle valve, 12 . . . first throttle shaft, 13 . . . bearing, 14 . . . bearing, 15 . . . first alignment lever, 15A . . . alignment bar, 15Aa, 15Ab . . . bent piece, 15B . . . limiting bar, 15Ba . . . bent piece, 16 . . . first full closing degree adjustment bolt, 17 . . . nut, 18 . . . return spring, 19 . . . first injector, 20 . . . second throttle body, 20*a* . . . coupling housing part, 21 . . . second throttle valve (angled throttle valve), 22 . . . second throttle shaft, 23 . . . bearing, 24 . . . bearing, 25 . . . second alignment lever, 25A . . . alignment bar, 25Aa . . . bent part, 25Ab . . . bent piece, 25B . . . limiting bar, 26 . . . second full closing degree adjustment bolt, 27 . . . nut, 28 . . . return spring, 29 . . . second injector, 30 . . . phase angle adjustment mechanism, 31 . . . transmission spring, 32 . . . support pin, 33 . . . phase angle adjustment screw, 34 . . . compression spring, 40 . . . motor, 40*a* . . . pinion gear, 41 . . . reduction gear mechanism, 42 . . . double gear, 42*a* . . . large-diameter gear, 42*b* . . . small-diameter gear, 43 . . . support shaft, 44 . . . sector gear, 45 . . . throttle position sensor, and Ba . . . gearbox.

What is claimed is:

1. An intake system provided to intake passages of an internal combustion engine with parallel cylinders, the intake passages extending from combustion chambers of the cylinders, the intake passages comprising a first intake passage and a second intake passage, the intake system comprising:

a first throttle body being provided to the first intake passage, the first throttle body being configured to adjust flow rates of intake air;

a second throttle body being provided to the second intake passage, the second throttle body being configured to adjust flow rates of intake air;

a first throttle shaft being provided to the first throttle body;

a second throttle shaft being provided to the second throttle body;

a first throttle valve being rotatably and axially supported by the first throttle body while being fixed to the first throttle shaft, the first throttle valve being configured to open and close the first intake passage of the first throttle body so as to control flow rates of intake air flowing into the cylinders;

a second throttle valve being rotatably and axially supported by the second throttle body while being fixed to the second throttle shaft, the second throttle valve being configured to open and close the second intake passage of the second throttle body so as to control flow rates of intake air flowing into the cylinders; and a power transmission mechanism being configured to transmit power from a power source to the first throttle shaft and the second throttle shaft so as to synchronize and simultaneously turn the plurality of the first throttle valve and the second throttle shaft for opening or closing the first intake passage and second intake passage, wherein the second throttle valve is an angled throttle valve having a first angle at an open position relative to the first throttle valve, and wherein the second intake passage communicates with the cylinder in which output is low when a vehicle is idling.

2. The intake system according to claim 1, wherein the first angle of the angled throttle valve relative to the first throttle valve is a minute angle.

3. The intake system according to claim 1, wherein the first throttle shaft and the second throttle shaft are separate bodies and are disposed coaxially, the first throttle shaft is fitted with a first alignment lever, the second throttle shaft is fitted with a second alignment lever, and a phase angle adjustment mechanism for adjusting the first angle is provided between the first alignment lever and the second alignment lever.

4. The intake system according to claim 3, wherein the first alignment lever includes a first full closing degree adjuster for adjusting a full closing degree of the other throttle valve during non-operation of the power source, and the second alignment lever includes a second full closing degree adjuster for adjusting a full closing degree of the angled throttle valve during non-operation of the power source.

5. The intake system according to claim 2, wherein the first throttle shaft and the second throttle shaft are separate bodies and are disposed coaxially, the first throttle shaft is fitted with a first alignment lever, the second throttle shaft is fitted with a second alignment lever, and a phase angle adjustment mechanism for adjusting the first angle is provided between the first alignment lever and the second alignment lever.

* * * * *